(12) United States Patent
Janovec et al.

(10) Patent No.: US 8,267,138 B2
(45) Date of Patent: Sep. 18, 2012

(54) LAMINATOR

(75) Inventors: Jeffrey D. Janovec, River Falls, WI (US); Mark D. Zender, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 992 days.

(21) Appl. No.: 12/236,928

(22) Filed: Sep. 24, 2008

(65) Prior Publication Data

US 2010/0006230 A1  Jan. 14, 2010

(51) Int. Cl.
 *B29C 65/14* (2006.01)
(52) U.S. Cl. .............. 156/379.6; 156/510; 156/523
(58) Field of Classification Search ......... 156/379.6, 156/510, 523
See application file for complete search history.

(56) References Cited

U.S. PATENT DOCUMENTS

| | | |
|---|---|---|
| 4,847,237 A | 7/1989 | Vanderzanden |
| 5,473,406 A * | 12/1995 | Hassall et al. ............ 355/22 |
| 5,508,105 A | 4/1996 | Orensteen et al. |
| 5,647,938 A * | 7/1997 | Levine ............... 156/269 |
| 5,672,381 A | 9/1997 | Rajan |
| 5,818,492 A | 10/1998 | Look |
| 5,832,643 A | 11/1998 | Delaquila et al. |
| 5,897,738 A | 4/1999 | Rajan et al. |
| 6,246,428 B1 | 6/2001 | Look et al. |
| 6,576,390 B1 * | 6/2003 | Shimizu et al. ......... 430/207 |
| 6,712,532 B2 | 3/2004 | Look |
| 7,008,128 B1 | 3/2006 | Nakanishi |
| 2001/0013283 A1 | 8/2001 | Pfundstein et al. |
| 2006/0283099 A1 | 12/2006 | Tumlinson et al. |
| 2008/0019753 A1 | 1/2008 | De Waal |
| 2010/0071240 A1 | 3/2010 | Fiegen et al. |

\* cited by examiner

*Primary Examiner* — Daniel McNally
(74) *Attorney, Agent, or Firm* — Sandra K. Nowak; Lisa P. Fulton (57) ABSTRACT

The present application generally relates to methods, materials, and equipment for manufacturing a signs. Some embodiments of the present application relate to methods of manufacturing a digitally printed, multi-panel sign. Some embodiments of the present application relate to a laminator for use in laminating optically active sheeting to a substrate.

9 Claims, 9 Drawing Sheets

LAMINATOR

TECHNICAL FIELD

The present application relates generally to an apparatus for laminating optically active sheeting to a substrate.

BACKGROUND

Signs are commonly used along roadways to display information to motor vehicle drivers and pedestrians. The term "sign" as used herein refers to a stand-alone article that conveys information, usually by means of alphanumeric characters, symbols, graphics, or other indicia, and that in use is mounted to an object such as a post, bracket, wall, or similar body. Specific examples include signs used for traffic control purposes (STOP, YIELD, speed limit, informational, overhead highway sign, roadside markers, etc.), street signs, guide signs, and vehicle license plates. Guide signs are those signs used to direct road users along streets and highways, to inform them of intersecting routes, to direct them to cities, towns, villages, or other important destinations, to identify nearby rivers and streams, parks, forests, and historical sites, and generally to give such information as will help them along their way in the most simple, direct manner possible.

Many signs include optically active (e.g., reflective or retroreflective) sheeting that has characters or images printed or placed thereon. The characters or images provide information that is of interest to the motor vehicle drivers or pedestrians, and the retroreflective sheeting allows the information to be vividly displayed at night. The term "retroreflective" as used herein refers to the attribute of reflecting an obliquely incident light ray in a direction antiparallel to its incident direction, or nearly so, such that it returns to the light source or the immediate vicinity thereof. Retroreflective sheeting has the ability to return a substantial portion of incident light in the direction from which the light originated. Light from motor vehicle headlamps is retroreflected by the signs, allowing the information to be read more easily by passing motorists and pedestrians. The following will be discussed with respect to retroreflective signage, but the application is meant to include non-retroreflective embodiments as well.

Figure 1:
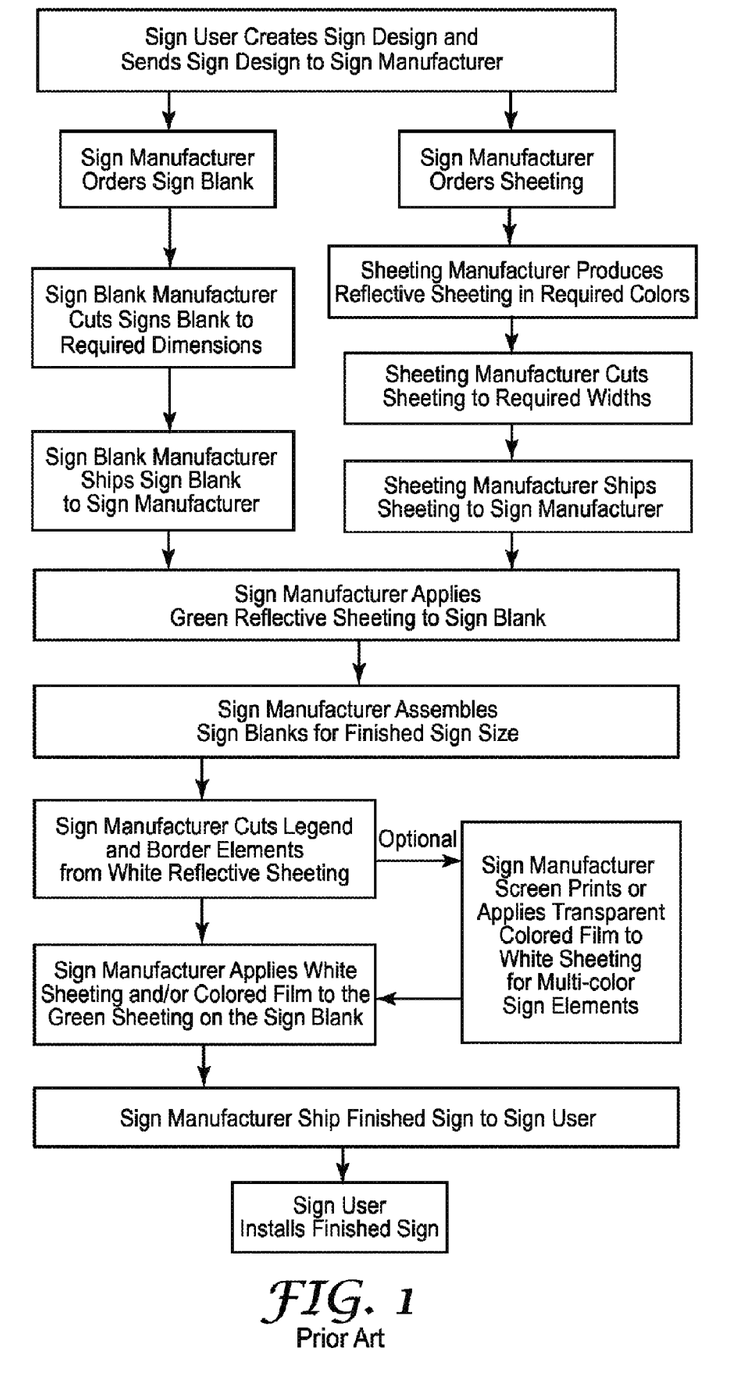
FIG. 1 is a flowchart showing a prior art process of manufacturing a guide sign.

Typically, a conventional guide sign that includes retroreflective sheeting is manufactured as is shown in FIG. 1. First, the sign user (typically a government agency) creates a sign design and sends the sign design to a sign manufacturer. The sign manufacturer orders the required sign blank from a sign blank manufacturer and the required optically active sheeting from a sheeting manufacturer. A sign blank is a rigid substrate suitable for mounting in the intended end use application. Exemplary sign blanks include a rigid mass of metal, wood, plastic, or the like. A sign blank manufacturer will receive the sign manufacturer's order and will cut the sign blank to the required dimensions and ship the sign blank to the sign manufacturer. In the meantime, the sheeting manufacturer will produce the required optically active sheeting in the required colors, will cut the sheeting to the required widths, and will ship the optically active sheeting to the sign manufacturer.

Upon receipt of the sign blanks and the optically active sheeting, the sign manufacturer implements the following process, which is described with respect to one exemplary specific implementation. In this exemplary implementation, the desired guide sign includes four 18 inch×12 inch aluminum extrusions each having a major surface and two opposed lateral surfaces generally perpendicular to the major surface. The sign manufacturer applies retroreflective sheeting having a first color (e.g., green) to the major surface (the "front surface") of each of four aluminum extrusions such that the green retroreflective sheeting completely covers the front surface and is wrapped around at least a portion of the two lateral surfaces. The green retroreflective sheeting is prepared by removing the release liner on the sheeting so as to expose a pressure sensitive adhesive layer. Then the green retroreflective sheeting is applied to the generally smooth, flat front surface of the aluminum extrusion so that the pressure sensitive adhesive layer contacts the front surface of the aluminum extrusion. This process is repeated for four aluminum extrusions, after which the covered extrusions are bolted together to form a multi-panel sign.

Indicia (e.g., letters, numbers, images, and/or symbols) is/are then cut out of retroreflective sheeting having a second color (e.g., white) that is a different color than the first color using a plotter (alternatively, a router could also be used if the sheeting has previously been applied to aluminum). These individually cut indicia are then manually aligned in the necessary position and applied and/or affixed to the sign face using adhesive, welding techniques, or rivets. In instances where the indicia overlap two adjacent sign blanks, the portion of the indicia that does not physically contact either sign blank is cut with a knife. If the sign design includes multi-color indicia, these are typically either screen printed onto the sign (described in greater detail below) or are cut out using numerous colors of optically active sheeting using the method described above.

Alternatively or in addition to the method described above, the indicia may be placed on the retroreflective sheeting by other methods such as, for example, screen printing. In screen printing, a positive or negative image of the characters is first provided on a screen. This is often accomplished by exposing non-masked portions of a photosensitive screen to light and removing the un-sensitized, masked regions by scrubbing. Ink is then forced through the openings in the screen where the photosensitive material was removed onto the retroreflective sheeting. Screen printing is the method of choice for making the more common street signs, such as "stop" and "yield" signs. However, screen printing custom or unique signs (such as, for example, highway and road signs) is costly and inefficient because a separate screen needs to be made for each individual sign.

Once the indicia are affixed to the sign, the finished sign is shipped to the end user. The sign user may then install the signs. Those of skill in the art will appreciate that each of these steps may be modified and that each step can be performed by an entity other than the one described in this specific example.

SUMMARY

There is a continuing need to improve the performance, reduce the cost, and to simplify the manufacture of signs.

The present application generally relates to methods of manufacturing digitally printed, multi-panel guide signs, including, but not limited to, printing tiled or paneled traffic signs that include optically active sheeting.

One embodiment of the present invention relates to a method of manufacturing a multi-panel sign. The method involves digitally printing an image on each of multiple optically active materials to form multiple optically active image-bearing materials; applying each of the optically active image-bearing materials to a support structure to form a signage support structure; and aligning multiple signage support structures so that the portion of the image on each signage support structure is in registration with the corresponding portion of the image on each adjacent signage support structure and so that the aligned multiple signage support structures form a finished multi-panel sign.

Another embodiment of the present invention relates to a method of manufacturing a multi-panel sign. The method involves creating a sign design; panelizing the sign design; digitally printing the sign design onto each of multiple panels of optically active sheeting using one or more highly durable inks; applying a protective film to the printed optically active sheeting; affixing each of the multiple panels of the printed optically active sheeting to a substrate; and assembling multiple substrates to form a finished multi-panel sign.

Another embodiment of the present application is a laminator for use in laminating optically active sheeting to a substrate, comprising: a conveyor that advances one or more substrates through the laminator; equipment that facilitates unwinding of a roll of optically active sheeting such that an adhesive-coated major surface of the optically active sheeting faces the one or more substrates and a major surface of the sheeting is opposite the adhesive-coated major surface; equipment that facilitates alignment of the optically active sheeting with the one or more substrates including a light source that emits light rays and that is positioned under the conveyor so that the light rays propagate upward through the conveyor toward the one or more substrates on the conveyor; wherein the one or more substrates have a degree of opacity that is greater than a degree of opacity of the optically active sheeting such that the light rays emitted by the light source cast a shadow of a proximal edge of the substrate onto the optically active sheeting and using this shadow, an operator can manually align the proximal edge of the substrate with indicia on the optically active sheeting and then manually press the adhesive-coated major surface of the optically active sheeting onto the substrate to adhere together the optically active sheeting and the substrate.

Another embodiment of the present application is a laminator for use in laminating optically active sheeting to a substrate, comprising: a conveyor that advances one or more substrates through the laminator; equipment that facilitates unwinding of a roll of optically active sheeting such that an adhesive-coated major surface of the optically active sheeting faces the one or more substrates and a major surface of the sheeting is opposite the adhesive-coated major surface; and equipment that facilitates alignment of the optically active sheeting with the one or more substrates, including an alignment tool that is positioned adjacent to the conveyor so that a portion of the alignment tool can be manually adjusted to align the proximal edge of the substrate with indicia on the optically active sheeting and then can be used to cause the adhesive-coated major surface of the optically active sheeting to physically contact the substrate.

DETAILED DESCRIPTION

Various embodiments will be described in detail. These embodiments should not be construed as limiting the scope of the present application in any manner, and changes and modifications may be made without departing from the spirit and scope of the inventions.

Current methods of making conventional multi-panel guide signs have some disadvantages. Time-consuming, labor intensive, screen printing of indicia onto the optically active sheeting requires an expensive screen to be made. The cost of making such a screen may be acceptable when the signs are common and the screens can be used for multiple signs. However, when the sign includes individual information (such as a street or highway exit name), making a screen for each sign is cost prohibitive.

Consequently, some sign fabricators use cutout indicia. However, cutout indicia often peel away during weathering or when dirt or debris becomes lodged between the indicia sheeting and the signage sheeting. Further, cutout indicia often provide inadequate performance because sign fabricators typically maximize the number of indicia that they can fit onto a single sheet of retroreflective sheeting ("nesting the indicia") in order to minimize the raw material manufacturing cost of the sign. Fitting the maximum number of cutout indicia into a single retroreflective sheeting ends up creating indicia that reflect light differently, and thus create a poorly performing sign. The alternative—creating cutout indicia that all have the same optical orientation—creates significant waste and thus increases the raw material manufacturing costs.

The inventors of the present application invented methods, apparatuses, and materials that facilitate the manufacture of digitally printed multi-panel signs.

Figure 2:
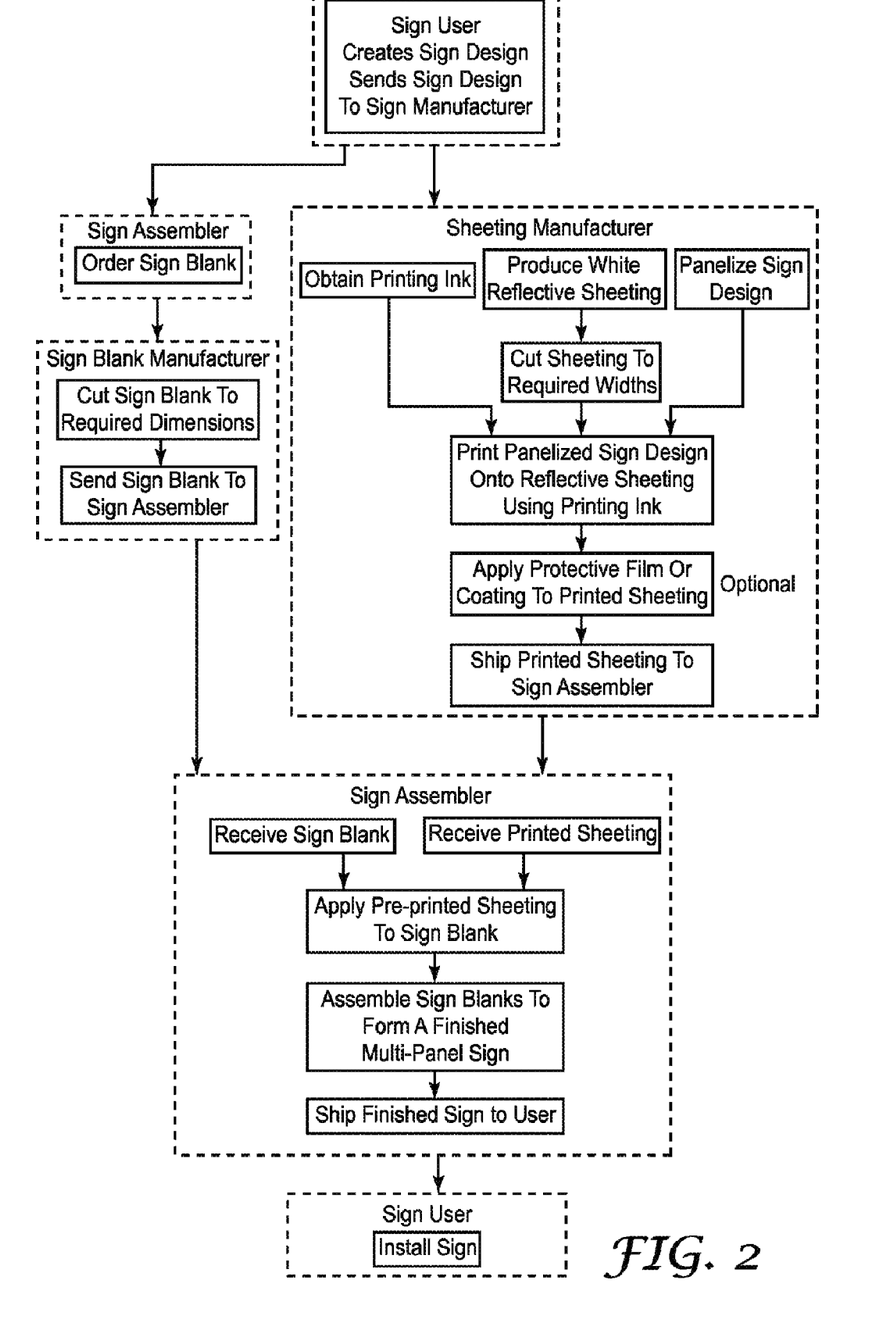
FIG. 2 is a flowchart for one exemplary process of digitally printing a guide sign.

One exemplary method of manufacturing digitally printed multi-panel signs is described generally in the flowchart shown in FIG. 2. In the exemplary embodiment shown in FIG. 2, a sign user (typically a government agency) creates a sign design and sends the sign design to a sign manufacturer. In some preferred implementations, the sign design is digital and is sent via email or an internet. However, the sign design could come from any of numerous sources. For example, the sign user could design the sign using their own software such as, for example, those sold under the trade designations "Adobe Illustrator," "FlexiSIGN," "SignCAD," "Traffic-CAD," or a similar program. Alternatively, the sign design could be generated at a website with design features that allow sign users to design their signs. In this instance, basic design software would reside at the website to assist the customer with creation of the sign design. One example of this implementation is the www.skinit.com site. Alternatively, the sign design could be generated by a sign or sheeting manufacturer or assembler using end user input. Such input could include verbal instructions, photographic examples, and/or basic CAD type drawings.

Following preparation of the sign design, the sign design is panelized to fit the number, shape, and size of the sign blanks (or panels) that will be used. In some preferred implementations, the sheeting manufacturer or sign assembler panelizes the sign design, produces the required optically active sheeting in the required colors, cuts the sheeting to the required widths, and obtains the printing ink.

Figures 3A, 3B:
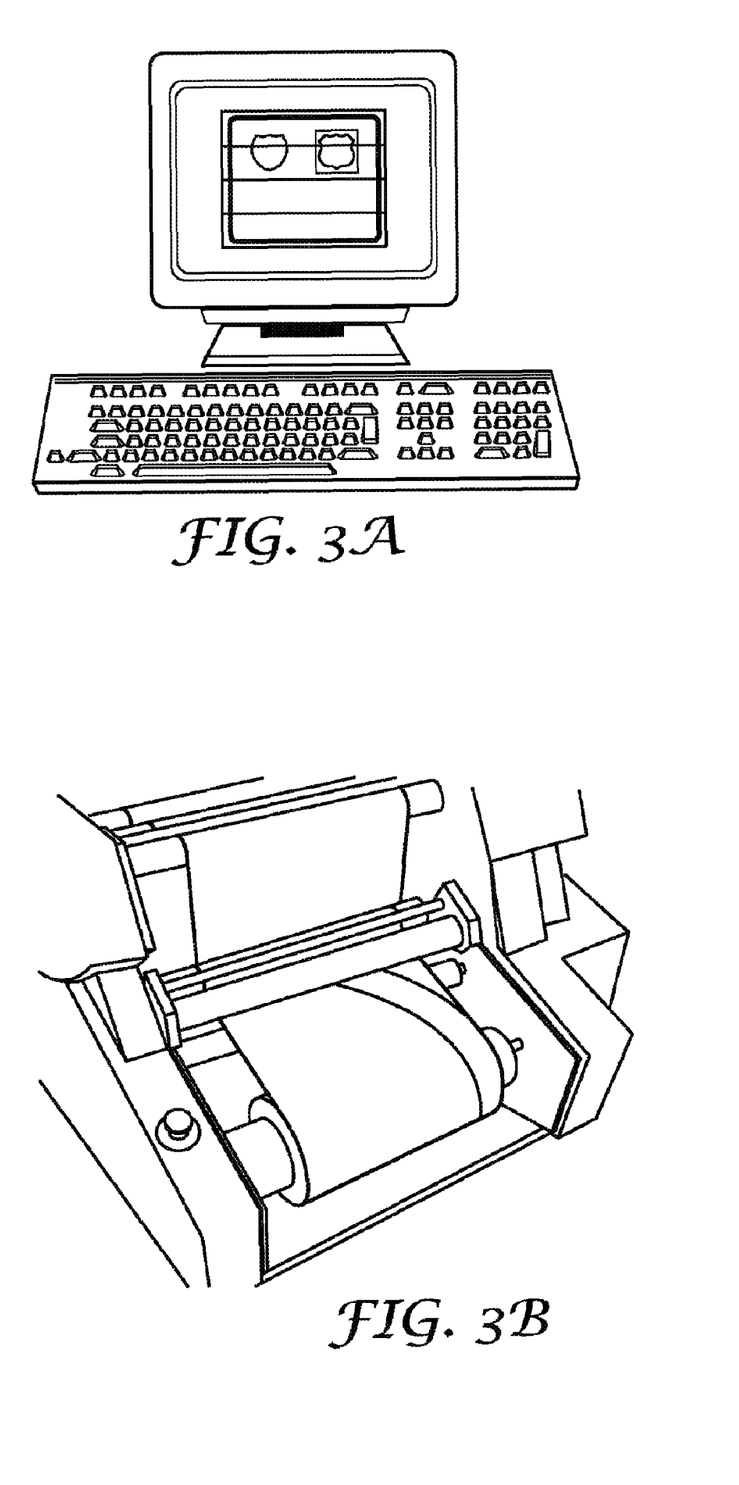
FIGS. 3A-3D are schematic views of various steps in the process of FIG. 2.

FIGS. 3A-3D schematically shows the process of panelizing the sign design. As shown in FIG. 3A, this process involves taking the sign design requested by the sign user and preparing from it a mechanical drawing or digital file that takes into consideration the number of individual pieces of sheeting that will have to be printed and/or attached to form the entire sign and relating these to the format of the sign being created. Exemplary considerations taken into account when preparing a panelized sign design include the dimensions of the sign blanks that will be used in the finished sign, the width dimension of the optically active sheeting, and the amount of sheeting that will be wrapped around or attached to the sides of the sign blank (edge wrapping) in the specific implementation.

Figure 3C:
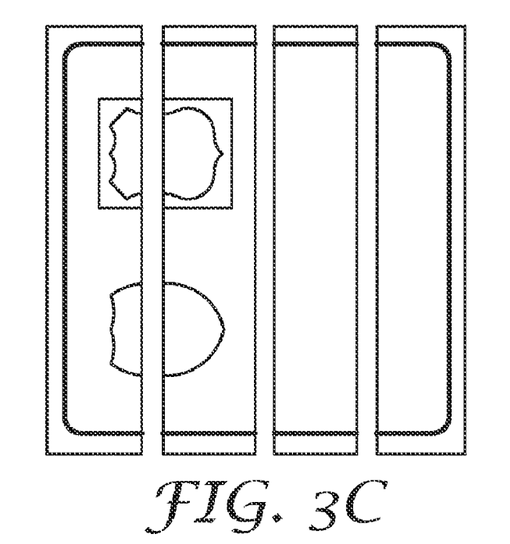
Figure 3D:
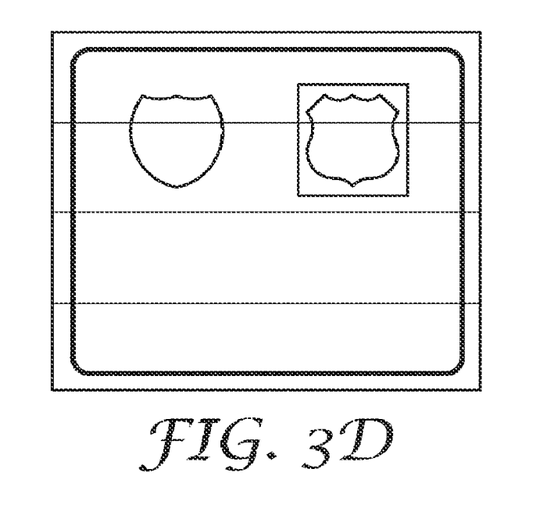

As is shown schematically in FIG. 3B, the sheeting manufacturer then digitally prints each panel of the panelized sign design onto a sheet of optically active sheeting using the printing ink. Such digital printing may be accomplished by, for example, a thermal printer. Known thermal mass transfer printing techniques that can be used in connection with the present invention include those described in U.S. Pat. Nos. 6,712,532 (Look); 6,246,428 (Look et al); 5,818,492 (Look); 5,508,105 (Oresteen et al); and 4,847,237 (Vanderzanden). In some instances, the sheeting manufacturer may apply a protective film or coating to the printed sheeting to, for example, provide enhanced durability, weatherability, or optics. Most signs require numerous pieces of digitally printed sheeting that are placed in alignment or registration with one another to produce the finished sign. FIG. 3C schematically shows four individual, printed pieces of optically active sheeting, and FIG. 3D shows these four pieces of printed sheeting placed into registration or alignment to form the finished sign.

The sheeting manufacturer then ships all of the pieces or panels of printed sheeting necessary to make a single sign to a sign assembler, who orders the support structure or sign blank and, upon receipt of the sign blank from a sign blank manufacturer, applies or affixes (for example, by lamination) the printed sheeting (or image-bearing materials) to the sign blank(s). Where more than one sign blank forms the finished sign, the sign assembler must align the individual sign blanks to which sheeting has been applied so that the portion of the indicia on each individual sign blank is in alignment or registration with the portion of the indicia on an adjacent sign blank (see, for example, FIGS. 3C and 3D). Following such alignment or registration, the sign assembler bolts together the numerous sign blanks. The finished sign is then shipped to the sign user.

Those of skill in the art will recognize that additional steps may be added to this process. One exemplary additional step in this process could include, for example, attaching the finished sign to a support structure and installing the finished sign. Also, those of skill in the art will appreciate that each of these steps may be modified and that each step can be performed by an entity other than the one described in this specific example. Those of skill in the art will also recognize that many changes and alterations and substitutions may be made to the general process described above. All of these changes and alterations and substitutions are within the inventive concept and are within the scope of the present application. For example, the finished sign can be made using a substrate other than a sign blank, such as, for example, a flat panel. In such instances, the sign may be printed using a commercially available large format printer and the sign may be printed all at once and not require multiple, individual panels that are printed and then assembled.

In some implementations, the sign manufacturer may format the signs to have unprinted fields or sheeting portions onto which panels or graphics will be attached, for example, the US Highway Interstate shield, state and county highway route markers, and other multicolor elements. In such instances, the resulting sign may have portions that are screen printed or that include one or more cutouts.

Those of skill in the art will recognize that the steps in this general process may be carried out by individuals or groups other than those mentioned above with respect to this specific implementation. For example, the sign user or sheeting manufacturer could assemble the sign (including applying the printed sheeting to the sign blank and assembling the sign blanks to form the finished sign). Further, the order of the steps can be changed from those described above or shown in the related Figures.

The optically active sheeting used in connection with the examples in the present application can be, for example, reflective or retroreflective. Two known types of retroreflective sheeting are microsphere-based sheeting and cube corner sheeting. Exemplary optically active sheeting includes any of the prismatic and beaded sheeting products manufactured by 3M Company of St. Paul, Minn. For reasons that will be discussed in greater detail below, in some implementations, the sheeting is preferably semi-transparent. For reasons that are described in greater detail below, the sign blank preferably has a degree of opacity that is greater than the optically active sheeting.

The inks used in connection with the examples in the present application are preferably highly durable because of their intended use and exposure to outdoor elements. Exemplary inks include UV inks or thermal transfer ribbons described, for example, in U.S. Patent Publication No. 2008/0118638. In some implementations, a clear transfer film may be used. Such a film may, for example, complete the optics package and/or provides additional durability and/or weatherability.

Methods of digitally printing guide signs have numerous advantages over the prior art methods of manufacturing guide signs. One advantage is a reduction in the total labor cost in the manufacture of signs. Another advantage is a reduction in the cycle time in the manufacture of signs. Prior art methods of printing multi-panel guide signs took, on average, two or more working shifts. In contrast, digitally printing the multi-panel guide signs takes, on average, less than one working shift.

Another advantage is a reduction in the opportunity for human error because the sign is digitally printed directly from the design file. Another advantage is streamlining the number of steps required to format and create the sign. Another advantage is minimizing or eliminating the risk of cutout indicia being exposed to weathering and peeling off the sign. More specifically, because the indicia are printed on the sheeting, they have no edges, so no dirt or debris can get under them and they do not experience peeling or delamination, both of which are common when cutouts are used. Another advantage is that printed signs in roll form occupy less space and thereby reduce inventory costs. Additionally, signs made according to the above-described methods exhibit improved color match and ensure consistent optical orientation of the indicia. Consequently, these methods provide a sign with uniform optical performance.

Digital printing of guide signs has not been practiced prior to the inventions by the present inventors for a variety of reasons, some of which are described below. One such reason is that ensuring correct registration or alignment of the individually printed panels of optically active sheeting and the indicia printed thereon is challenging. Not only must the individually printed panels must be of the same length, the indicia printed on the individual panels must match when the individually printed panels are aligned and when the indicia are aligned, each of the sign blanks must align perfectly so that the multi-panel sign has evenly aligned sides.

Further, many preferred implementations of the above-described method involve printing on optically active sheeting having a width dimension that is greater than the width dimension of the sign blank and then edge wrapping the excess sheeting around the sign blank. Edge wrapping, i.e. folding of the marginal edges of the printed sheeting about the lateral sides of the sign blank, may provide enhanced weatherability of the printed sheeting as well as prevent delamination of the printed sheeting. Further, edge wrapping can provide leniency around having the printed image exactly centered on the sign blank because the printed overlap/overhang portion minimizes the effect of a slight or minimal error in centering the printed sheeting on the sign blank.

One consequence of edge wrapping is that not only must the indicia on adjacent panels be in alignment or registration, but they must be in alignment or registration after taking into consideration the portion of the sheeting that is edge wrapped around the edge of each sign blank. To that end, one must ensure that each printed panel of sheeting is accurately affixed or adhered to the sign blank. An example of what could happen if the sheeting and sign blank are not aligned is as follows: if the printed panel of sheeting is applied to the sign blank at a slight angle such that the portion of the sheeting that is wrapped at one end of the sign blank is 0.25 inches and the portion of the sheeting that is wrapped at the opposite end of the sign blank is 0.35 inches, the indicia on adjacent panels will not be in alignment or registration.

Further, the process of edge wrapping optically active sheeting can be technically difficult. Attempts to edge wrap optically active sheeting at room temperature often result in cracking of the sheeting. Heating the sheeting softens the sheeting, making edge wrapping easier, but can result in the printing on the optically active sheeting running or becoming tacky and being smeared during downstream processing.

Additionally, optically active sheeting can experience stretch during the process of affixation to a sign blank. This cumulative stretch will result in a sign that lacks registration or alignment of its panels and/or indicia. Consequently, this cumulative stretch must be eliminated or minimized. Additionally, the amount of stretch or sheeting web tension of the printed sheeting differs based on whether the sheeting is printed versus unprinted. An apparatus that takes this difference into consideration and accounts for it is necessary to conduct the above-described method of manufacturing digitally printed multi-panel signs.

The inventors of the present application have also invented various apparatuses that address, minimize, or resolve some of the above-identified challenges to digitally printing guide signs. One such apparatus is an improved laminator that affixes or adheres the printed optically active sheeting to a sign blank.

As is described above, one challenging aspect of manufacturing a digitally printed multi-panel sign is that the alignment or registration of the printed optically active sheeting and the sign blank or sign substrate is essential to ensure accurate alignment of adjacent panels and to produce a multi-panel sign that satisfies the sign user's requirements. Effecting alignment of the printed sheeting and the substrate is challenging because existing laminating equipment does not provide adequate alignment mechanisms to facilitate or provide manual control of this alignment. Consequently, the inventors of the present application invented an improved laminator that includes improved alignment or registration equipment.

Figure 4:
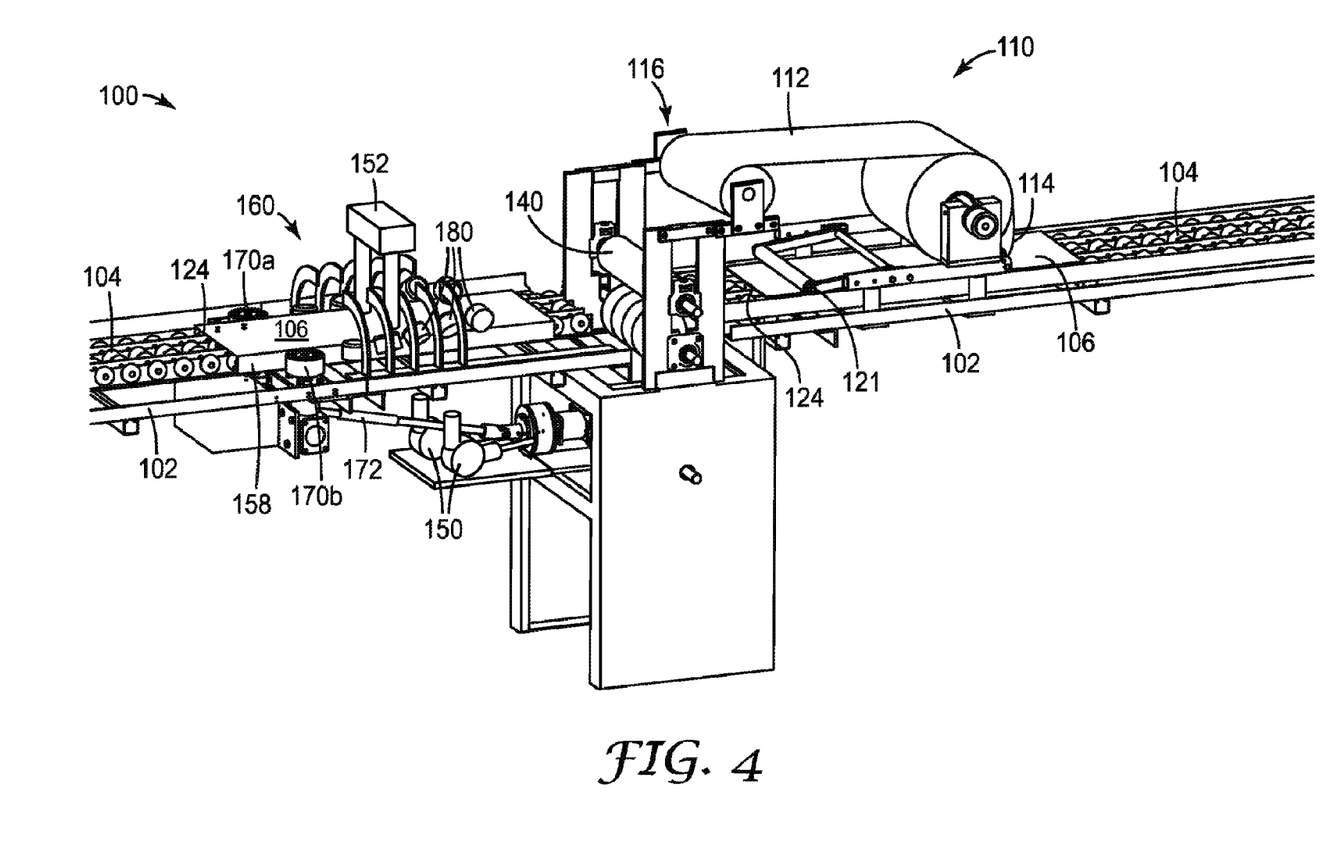
FIG. 4 is a cutaway, perspective, side view of a laminator of the present application.
Figure 6:
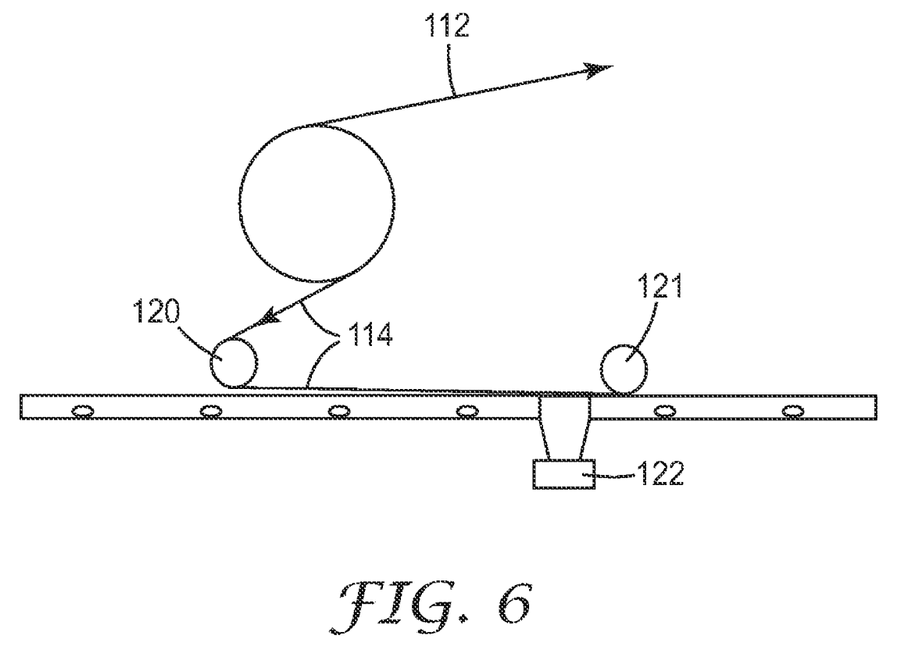
FIG. 6 is a schematic view of the portion of the laminator shown in FIG. 5.

FIG. 4 is a cutaway, perspective, side view of pertinent portions of a laminator 100. Laminator 100 includes a frame 102 (e.g., steel frame) to which is mounted multiple conveyors 104 that form a substantially horizontal conveyor belt that conveys sign blanks 106 through laminator 100. A roll of printed optically active sheeting is mounted at an unwind station 110. As the optically active film unrolls from the roll, it is separated into a release liner 112 and optically active sheeting 114. As the roll of printed optically active film unrolls, release liner 112 is collected at a winding station 116 and optically active sheeting 114 is held aloft from but is aligned with sign blank 106 by a pack roller 121 that is mounted on frame 102 (see FIG. 6). Optically active sheeting 114 includes two major surfaces, one of which is a printed surface 111 and one of which is coated with an adhesive 113. Printed surface 111 faces the ceiling while the adhesive-coated surface 113 faces sign blank 106.

A light emitting device 122 (shown in cutaway in FIG. 5) is positioned below conveyors 104 such that light emitting device 122 emits light rays that propagate past sign blank 106 on conveyors 104 toward optically active sheeting 114. The light rays emitted by light emitting device 122 create a shadow on optically active film 114. This shadow allows an operator to clearly see a first proximal edge 124 of sign blank 106 and to align first proximal edge 124 of sign blank 106 with printed indicia on optically active sheeting 114.

Figure 5:
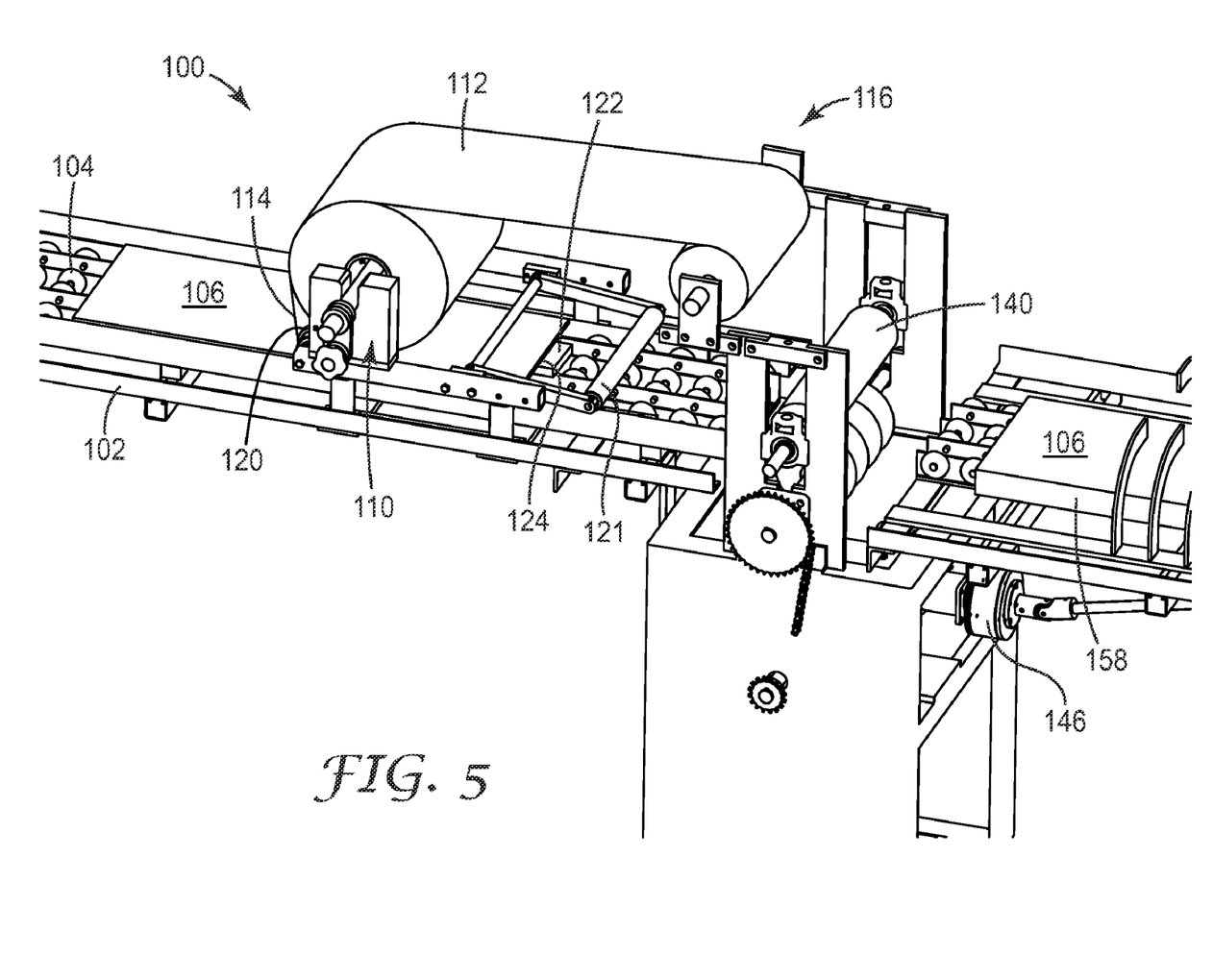
FIG. 5 is a perspective side view of the unwind station of the laminator shown in FIG. 4.

More specifically, using a foot pedal (not shown), the operator stops conveyors 104 from advancing sign blank 106 and optically active sheeting 114. Specifically, in some embodiments, when the foot pedal is released, motion stops. The operator then manually aligns indicia 126 on the printed optically active sheeting 114 with first proximal edge 124 of sign blank 106 using the shadow created by first proximal edge 124 of sign blank 106 positioned directly underneath indicia 126 on printed optically active sheeting 114. The shadow allows the operator to determine the position of printed optically active sheeting 114 in relation to sign blank 106. During this process, printed optically active sheeting 114 is suspended above sign blank 106 until the manual operator aligns the two. Once the operator has aligned first proximal edge 124 of sign blank 106 with indicia 126 on optically active sheeting 114, the operator manually presses printed optically active sheeting 114 down onto sign blank 106 such that the portion of sheeting 114 including an adhesive (e.g., a pressure sensitive adhesive) adheres to sign blank 106. The resulting bond has sufficient strength to pull the adhered substrate or sign blank 106 and optically active printed sheeting 114 into the lamination portion of laminator 100. In this way, the operator effects visual edge sensing facilitated by the shadow created by the laminator.

Manual alignment of each individual sign blank and printed panel of optically active sheeting serves numerous purposes. One purpose is that it minimizes the effect of cumulative stretch of the optically active sheeting because the operator restarts and realigns with each panel. Further, manual alignment allows the operator to adjust for discrepancies between the length of the printed sheeting and the cut length of the sign blank. The operator can visually inspect the gap width and ensure that the sign sheeting is aligned with the edge of the sign blank panel. The light emitting device 122 mounted below the sign blank 106 has sufficient brightness to have good visibility through the sheeting 112.

After alignment has been accomplished, sign blank 106 is advanced by conveyors 104 until the first proximal edge 124 of sign blank 106 reaches a nip roll 140 that is driven by a power drive. Nip roll 140 draws sign blank 106 forward and laminates printed optically active sheeting 114 to sign blank 106. The guide roll preferably has adjustable collars that aid in lateral alignment and the natural weight of the lamination roll provides preliminary bonding before the sign blank panels are passed through the lamination nip. In some preferred embodiments, the lamination roll swings on a free-moving arm to facilitate the operator's manual alignment process.

The resulting laminated, printed panel then passes over a heat source 150 (that blows heated air onto the laminated, printed panel from below) and under a heat source 152 (that blows heated air onto the laminated, printed panel from above). Heat source 152 includes one or more openings that direct heated air onto the printed surface 111 of optically active sheeting 114 to heat it. Both heat sources 150 and 152 facilitate edge wrapping of the printed optically active film 114 around the lateral sides 158 of sign blank 106. Some preferred embodiments allow the operator to manually activate and adjust the heat settings on these heaters. The heaters facilitate pre-heating of the printed sheeting before it is edge-wrapped while minimizing overheating of the sheeting that results in causing the ink to run or become excessively tacky. In one preferred embodiment, the preheating function of the heaters is controlled by the foot pedal. Specifically, when the foot pedal is first depressed, the heaters are activates. A time delay can be manually adjusted between 1-20 seconds to allow the heaters to warm up before the drive train starts. The heaters and drive will continue to run for as long as the operator holds his/her foot on the pedal. However, once the pedal is released, the drive stops and there is an additional 1-20 second adjustable delay before the heaters turn off. If the pedal is again depressed during this delay, the drive will immediately start without the warm-up delay. This allows the operator to make quick adjustments.

The laminated, printed sign blank panel passes through an edge wrapping assembly 160 including numerous wrapping wheels 180 that bend the overhanging portion of printed optically active sheeting 114 to adhere to the lateral side portions 158 of sign blank 106. Wrapping wheels 180 are positioned on the outfeed conveyor portion of laminator 100 and are fixed at different contact angles so that optically active sheeting 114 is slowly wrapped around the lateral side portions 158 of sign blank 106.

Then, the laminated, printed panel passes through a pair of drive rollers 170a and 170b that are driven by a drive shaft 172. Drive rollers 170a and 170b are preferably slightly overdriven (or rotated) at a rate of approximately 10% faster than nip roller 140 to ensure that adjacent sign blanks 106 do not collide with one another. This difference in rate will preferably vary anywhere from between about 5% to about 25% depending on the specific use. Such a collision can crack the optically active sheeting 114 on each of the sign blanks 106. Overdriving the drive rollers 170a and 170b also helps to compensate for the natural slow down of the sign blanks 106 caused by the edge wrapping wheels 180.

Prior art laminators often include only a single drive to move the panels along the conveyor. Once the first sign blank has been laminated to the sheeting, the sheeting pulls subsequent sign blanks through the laminator. However, this process requires a significant amount of force to push the panels through the edge-wrapping assembly. Often, the sheeting that bridges the gap between the panels is not sufficiently stiff to support this load, so the panels are pushed together, which causes the sheeting to bend and crack at the panel edges. Some prior art attempts to minimize this involve using gap stops between the panels. However, these gap stops can prove ineffective because of the wide variance in gap width resulting from loose tolerances in panel fabrication. Consequently, the inventors of the present invention added a second drive after the edge-wrap station to pull the panels through the laminator and to maintain tension in the sheeting. One preferred set of drive rollers laterally squeezes the sign blanks as they pass through the edge wrap station. Exemplary rollers may be made of a semi-soft rubber to provide good traction on the sides of the sign blanks and to accommodate minor, lateral misalignment. The rollers are preferably set so that they just make contact with the sign blank's full side face, as too much deflection in the rollers can reduce the overdrive ratio. The laminator may also optionally include an adjustable-resistance, magnetic clutch in the drive train to prevent slip at the rollers in case of excess overdrive.

FIG. 5 provides a more detailed perspective view of the unwind station of the laminator 100 of FIG. 4.

Those of skill in the art will appreciate that the specific implementation shown in FIGS. 4 and 5 is merely one exemplary implementation of the inventive concepts. Many changes may be made to this implementation without departing from the spirit and scope of the present invention. For example, the laminator could include a pack roll to increase the initial tack between the optically active sheeting and the sign blank.

Figure 7:
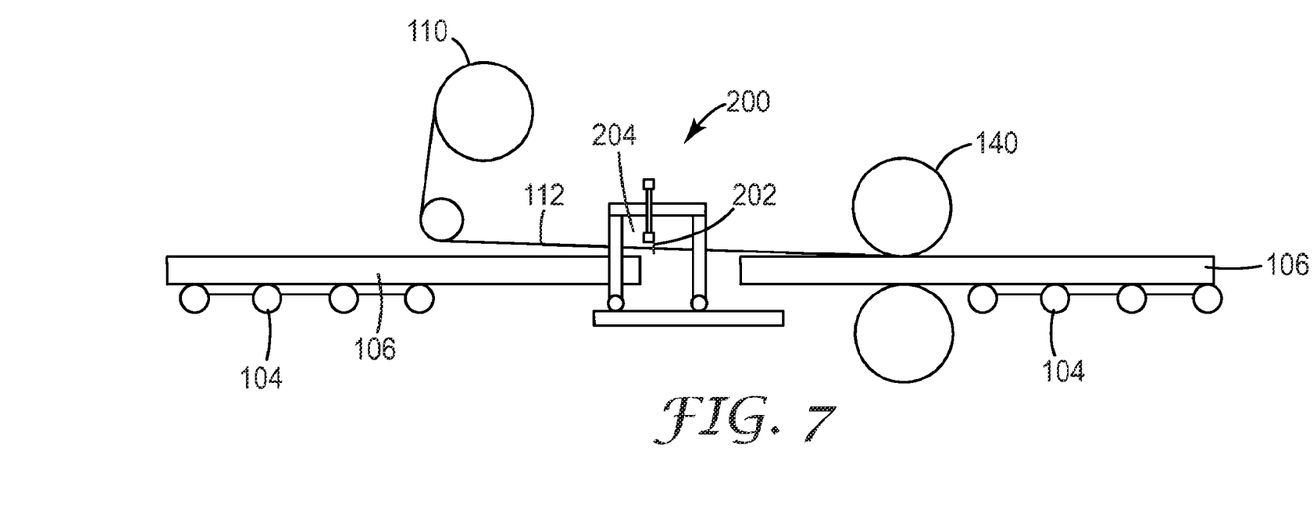
FIG. 7 is a schematic view of an alternative exemplary laminator.
Figure 8:
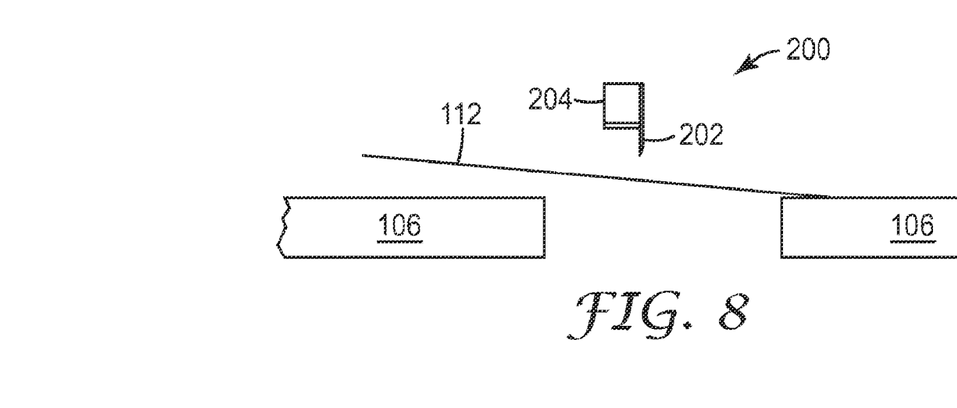
FIG. 8 is an expanded schematic view of a portion of the laminator of FIG. 7.

An alternative implementation of a laminator is shown in FIGS. 7 and 8. The laminator shown in FIGS. 7 and 8 involve manual alignment of the sign blank panel and the sheeting. However, instead of including a light source, the laminator of FIGS. 7 and 8 includes an alignment tool 200 to facilitate manual alignment of the sign blank panel with the sheeting. In one exemplary implementation, the operator aligns alignment tool 200 with the laminator/sheeting/sign blank such that the cutting portion of the tool (e.g., razor 202) is aligned with terminal edge 124 of sign blank panel 106. After the operator achieves such alignment, he/she manually adjusts (e.g., presses down) on alignment tool 200 such that the cutting portion 202 of the tool penetrates the sheeting 112. The operator then advances sign blank panel 106 until it contacts the razor 202 and then again presses down (or adjusts) alignment tool 200 so that the laminating bar 204 of alignment tool 200 presses sheeting 112 onto sign blank panel 106 to adhere sheeting 112 to sign blank panel 106. The operator then releases laminating bar 204 which causes razor 202 to retract. This alternative embodiment is especially useful where sheeting 112 is not sufficiently transparent such that light rays emitted by light source 122 will not pass through sheeting 112 (such as, for example, sheeting 112 that is vapor-coated). Those of skill in the art will appreciate that many modifications may be made to this specific implementation while still falling within the broad inventive concept of the present inventors.

Objects and advantages of the present application are further illustrated by the following examples, but the particular materials, equipment, and amounts thereof recited in the examples, as well as other conditions and details, should not be construed to unduly limit the application. All parts, percentages and ratios herein are by weight unless otherwise specified.

EXAMPLE 1

A laminator of the type shown in FIGS. 4 and 5 was constructed by starting with an "Extrusion/Barricade Applicator Walco Model 823" manufactured and sold by the Wallace Company of California, USA. The following modifications were made to the Walco Model 823 laminator: (1) the feeder (not shown in FIGS. 4 and 5) that was mounted after the nip roll was dismantled; (2) two steering collars were detachably secured to each extremity of the idler roller and were adjusted to the width of the printed optically active sheeting; (3) the pack roll was mounted on the steel frame by two metal rods extending lengthwise from the conveyors; (4) the light source that was used was a "QF 150 CL" manufactured and sold by RAB Lighting of New Jersey, USA and it was secured to the frame by a spring clamp (not shown); the heat source comprised two "3308K34" hot-air blowers manufactured and sold by McMaster-Carr Supply Company of Illinois, USA which were placed on an aluminum base connected to the steel frame by four metal rods (not shown) and which have a maximum temperature of 300° F.; (5) the laminator's electronic panel was modified to pre-heat the hot air blowers for five seconds before the conveyor began to transport the sign blank through the laminator; (6) the hot air blowers were set to heat the optically active sheeting to a temperature of 120° F. (48.9° C.) prior to edge wrapping the optically active sheeting around the sign blank.

Figure 9:
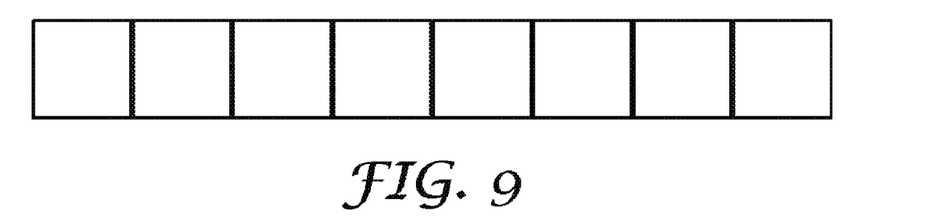
FIGS. 9-11 are schematic views of the signs printed in Examples 1-3, respectively.

A traffic sign was created by printing the indicia shown in FIG. 9. The indicia/image was created using commercially available software sold by Scanvec Amiable of Pennsylvania, USA under the trade designation "FlexiSIGN™." Each green rectangle is separated by a 0.25 inch white vertical line. The entire image measured 12 inches by 8 ft (0.9 m by 7.3 m). The image was then raster image processed (RIP) by software PhotoPRINT™ SERVER Matan Edition 4.6 v2 available from Matan Digital Printers of Rosh-Ha'ayin, Israel. Those of skill in the art will recognize that numerous commercially available RIP programs could be used, including, for example, Onyx™ and Scotchprint™.

The indicia/image was printed onto High Intensity Grade Prismatic Reflective Sheeting 3930—White manufactured and sold by 3M Company of Minnesota, USA having dimensions of 12.75 inches by 300 ft (32.4 cm by 91.4 m). The image was printed using a thermal-mass transfer printer commercially available from Matan Digital Printers under the trade designation "Matan Spark™ 1612." Those of skill in the art will recognize that numerous commercially available printers could be used, including, for example, UV ink jet printers, and thermal printers other than those manufactured and sold by Matan.

Traffic Green ribbon (TTR2308) manufactured and sold by 3M Company of St. Paul, Minn., USA was used to print the green rectangles. The sign blank used was an aluminum extrusion manufactured and sold by Mid America Extrusions, of Indiana, USA and having dimensions of 12 inches by 8 feet by 2 inches (30.5 cm by 183 cm by 5.1 cm). The width of the printed sheeting was 0.75 inches (1.9 cm) larger (wider) than the width of the aluminum sign blank allow edge wrapping. The printed reflective sheeting was transversally centered on the aluminum sign blank so that the marginal edges of the printed reflective sheeting overhung the width of the aluminum sign blank by 0.37 inch (0.95 cm) on each side. After edge wrapping, the printed reflective sheeting was manually cut using a utility blade knife, such as a knife commercialized by Stanley Works of Connecticut, USA.

Three aluminum sign blanks were prepared as described above and were then aligned to form a finished sign having accurate alignment or registration of the panels and the indicia. The three aluminum sign blanks were then attached to one another using bolts inserted into the openings disposed along the side panels.

EXAMPLE 2

Figure 10:
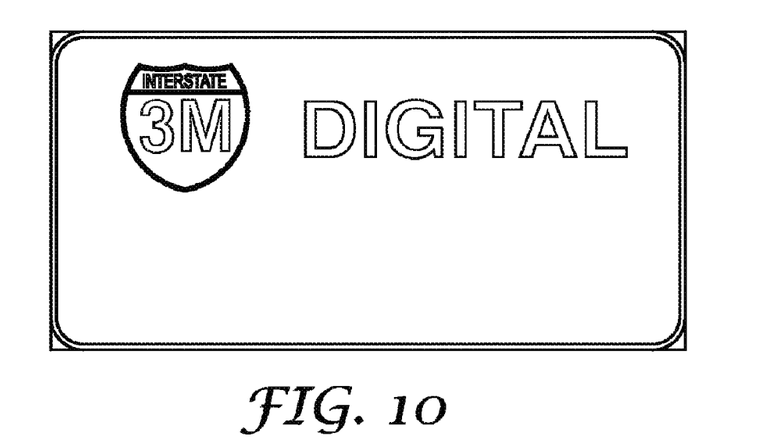

The laminator used in Example 1 was used in the manufacture/production of a sign as shown in FIG. 10. The sign measured 36 inches by 120 inches (91.4 cm by 305 cm) including a 1 inch (2.54 cm) thick rectangular border. The indicia or images on the sign include a green background; a red, white, and blue shield; and white letters. The sign design was created using SignCAD software, manufactured and sold by SignCAD Systems of Minnesota, USA. The image design was subsequently raster image processed (a raster image processor (RIP) is a component used in a printing system which produces a bitmap that is sent to a printing device for output) and tiled for adjustment and printing in three strips each of which measured 12.5 inches by 6 feet (31.7 cm by 1.8 m). "Tiled for adjustment" is meant to describe the following process: the 12.5 inch wide printed image is centered on 12.75 inch wide sheeting. The 0.25 inch along the top major surface of the sheeting and 0.25 inch along the bottom major surface of the printed sheeting is designated to be edge wrapped around the sign blank.

A roll of white printed reflective sheeting measuring 12.75 inches (32.4 cm) wide by 150 feet (45.7 m) long of the type commercialized by 3M Company under the trade designation "Diamond Grade DG3 Printed reflective sheeting 18 4090 White" was printed using a thermal mass transfer printer of the type described in Example 1 and using the Traffic Green ribbon described in Example 1 as well as Traffic Red, Traffic Blue, and Traffic Black ribbons (TTR2312, TTR2303, and TTR2312, respectively) commercially available from 3M Company. Each panel of the printed reflective sheeting was laminated to an aluminum sign blank of the type described in Example 1. The three panels were then aligned and bolted together as described in Example 1.

EXAMPLE 3

Figure 11:
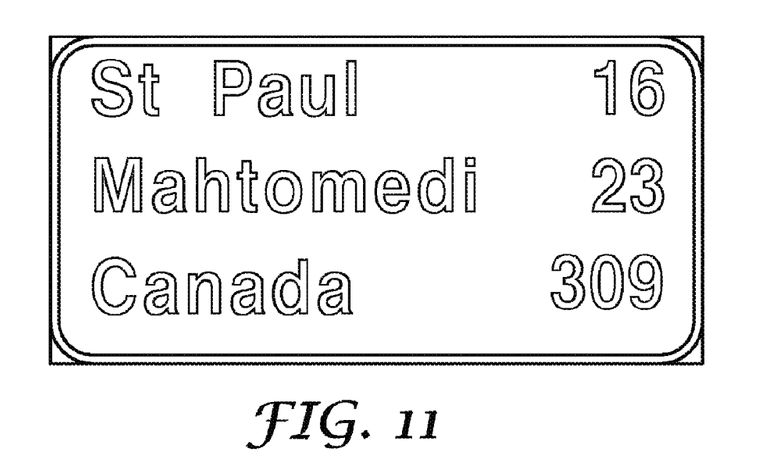

The laminator used in Example 1 was used in the manufacture/production of a sign as shown in FIG. 11. The sign measured 36 inches by 120 inches (91.4 cm by 305 cm) including a 1 inch (2.54 cm) thick rectangular border. The indicia or images on the sign include a green background and white letters. The sign design was created using SignCAD™ software, as described in Example 2. The image design was subsequently raster image processed.

A roll of white printed reflective sheeting manufactured and sold by 3M Company under the trade designation "High Intensity Grade Prismatic Printed Reflective Sheeting 3930 White" having dimensions of 12.75 inches by 300 feet (32.4 cm by 91.4 m) was laminated with an acrylic overlay manufactured and sold by 3M Company under the trade designation "3M Scotchlite Electrocut Film Series 1170" or "3M Scotchlite Electrocut Film Series 1159" by known laminating techniques using laminating equipment commercially available from Advanced Greig Laminators of Wisconsin, USA under the trade designation "WG36." The reflective sheeting was subsequently printed in the thermal mass transfer printer described in Example 1 using the green ribbon described in Example 1 to form six panels of printed sheeting. Each panel of printed sheeting was then laminated in the laminator shown in FIGS. 4 and 5 to each of six aluminum sign blanks of the type described in Example 1.

Those having skill in the art will appreciate that many changes may be made to the details of the above-described embodiments and implementations without departing from the underlying principles thereof. The scope of the present application should, therefore, be determined only by the following claims. Various modifications and alterations of the present invention will become apparent to those skilled in the art without departing from the spirit and scope of the invention.

What is claimed is:

1. A laminator for use in laminating optically active sheeting to a substrate, comprising:
   a conveyor that advances one or more substrates through the laminator;
   equipment that facilitates unwinding of a roll of optically active sheeting such that an adhesive-coated major surface of the optically active sheeting faces the one or more substrates and a major surface of the sheeting is opposite the adhesive-coated major surface; and
   equipment that facilitates alignment of the optically active sheeting with the one or more substrates, including an alignment tool in the form of a razor that cuts through the optically active sheeting when the razor has been manually adjusted to align the proximal edge of the substrate with indicia on the optically active sheeting; and
   wherein the alignment tool is positioned adjacent to the conveyor so that a portion of the alignment tool can be manually adjusted to align the proximal edge of the substrate with indicia on the optically active sheeting—and then can be used to cause the adhesive-coated major surface of the optically active sheeting to physically contact the substrate.

2. The laminator of claim 1, wherein the optically active sheeting is reflective or retroreflective.

3. The laminator of claim 2, wherein the retroreflective sheeting is prismatic or beaded.

4. The laminator of claim 1, wherein at least one of the substrates is a sign blank.

5. The laminator of claim 4, wherein the sign blank is an aluminum panel.

6. The laminator of claim 1, wherein the alignment tool includes a light source that emits light rays and that is positioned under the conveyor so that the light rays propagate upward through the conveyor toward the one or more substrates on the conveyor; and wherein the one or more substrates have a degree of opacity that is greater than a degree of opacity of the optically active sheeting such that the light rays emitted by the light source cast a shadow of a proximal edge of the substrate onto the optically active sheeting and using this shadow.

7. The laminator of claim 1, wherein at least one of the substrates is an extrusion panel.

8. The laminator of claim 1, wherein the indicia on the optically active sheeting are digitally printed onto the optically active sheeting.

9. The laminator of claim 1, further comprising equipment that allows edge wrapping excessive optically active sheeting around the substrate.

* * * * *

UNITED STATES PATENT AND TRADEMARK OFFICE
CERTIFICATE OF CORRECTION

| | | |
|---|---|---|
| PATENT NO. | : 8,267,138 B2 | Page 1 of 1 |
| APPLICATION NO. | : 12/236928 | |
| DATED | : September 18, 2012 | |
| INVENTOR(S) | : Jeffrey D Janovec et al. | |

It is certified that error appears in the above-identified patent and that said Letters Patent is hereby corrected as shown below:

Column 13,
Line 21-22, in claim 1, delete "sheeting–and" and insert -- sheeting and --, therefor.

Signed and Sealed this
Nineteenth Day of March, 2013

Teresa Stanek Rea
*Acting Director of the United States Patent and Trademark Office*